UNITED STATES PATENT OFFICE.

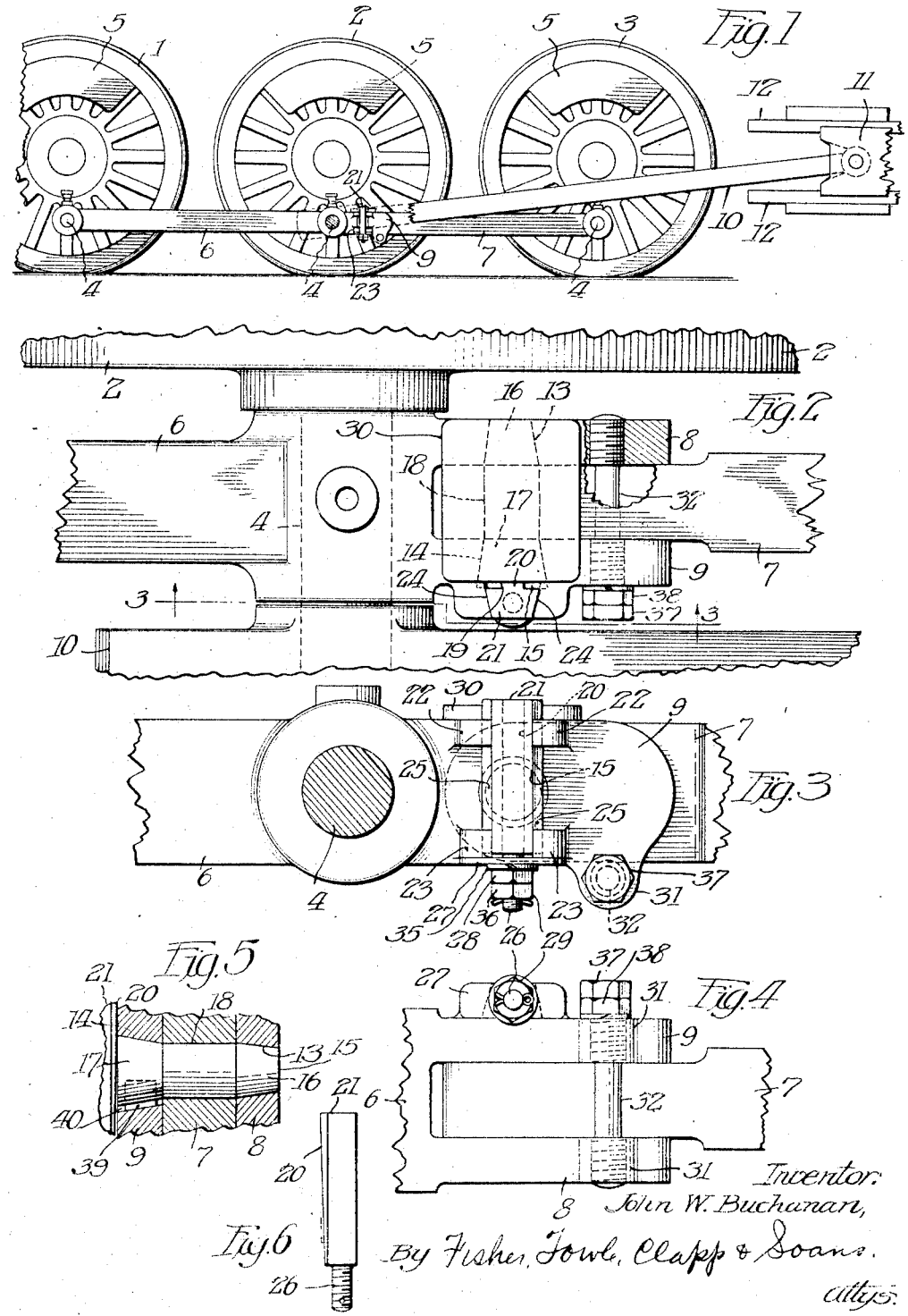

JOHN W. BUCHANAN, OF CHICAGO, ILLINOIS.

INVERTED KNUCKLE-PIN.

1,365,655.     Specification of Letters Patent.     Patented Jan. 18, 1921.

Application filed May 27, 1920. Serial No. 384,590.

*To all whom it may concern:*

Be it known that I, JOHN W. BUCHANAN, a citizen of the United States, residing at Chicago, in the county of Cook and State of Illionis, have invented certain new and useful Improvements in Inverted Knuckle-Pins, of which the following is a specification.

My invention has reference more particularly to a pivotal connection for uniting the adjoining ends of the side rods of a locomotive, being designed for this particular purpose, owing to the peculiar difficulties ordinarily encountered in making this connection.

In locomotive construction, side rods are employed to connect corresponding crank pins of the drive wheels so that the wheels all operate simultaneously, and it is necessary to pivotally connect the adjoining ends of these side rods so as to permit independent elevation and depression of each wheel due to unevenness or irregularities in the track surface. Heretofore it has been customary to make the connection by a pivot pin or, as it is commonly known, "a knuckle pin," which is inserted through the adjoining ends of the side rods from the inside. This arrangement, however, is very unsatisfactory as the side rods set so close to the side of the wheels that the latter interfere with the insertion of the pin, there being practically only one position of the wheel which permits inserting the pin in place, and that is the position where an opening between the spokes is in line with the pin opening in the side rods. It is therefore necessary, with the old type of knuckle pin connection, in assembling or dismantling the engine to be sure that the drive wheels are set exactly so that the knuckle pin may be withdrawn or inserted through the particular opening between the spokes, and this of course is very difficult, owing to the great weight of the locomotive, the space required to move the engine to the proper position and the necessity for close adjustment. It is therefore desirable to insert the pin from the outside, but this also presents difficulties as there is not sufficient room between the inner face of the side rod and the wheel to accommodate the usual means for securing the pin in place, and furthermore, the connecting rod which extends from the cross head of the engine to the crank pin of one of the intermediate wheels for operating the wheels from the engine cylinder, swings across the outer face of the side rods in such close relation that it is very difficult to devise satisfactory means which may be applied at the outer end of the knuckle pin, for holding the latter in place. Furthermore, as locomotives are already provided with side rods and it would involve great expense to equip them with new side rods, it is necessary to devise a construction whereby the knuckle pin may be applied from the outer side without requiring new side rods, but by merely making slight changes in existing rods which will enable the inverted knuckle pin to be employed.

The principal objects of my invention are to provide a pivotal connection for the side rods of a locomotive enabling the pivot pin, or knuckle pin, as it is commonly known, to be inserted from the outer side; to provide retaining means for the knuckle pin which is embraced within the limited space permitted therefor between the connecting rod and the side rods of the engine; to provide a construction in which a knuckle pin similar to that at present employed, or the same pin with slight changes, may be used and inserted from the outer side and retained in place; to provide a device of this character which may be applied to the existing types of connecting rods by merely changing the connecting rods from one side of the engine to the other and applying thereto the retaining means which I have devised; to provide means for joining together the divided end portions of the side rods to hold same against separation, and in general to provide an improved knuckle pin connection of simple form enabling the pin to be inserted from the outside and which may be applied to existing side rods and afford a secure and reliable pivotal connection of the adjoining ends of the side rods without necessitating any material changes in the standard engine construction.

On the drawings Figure 1 is a side view of the drive wheels of a locomotive and connections showing the application of my invention thereto; Fig. 2 an enlarged top view of my knuckle pin connection; Fig. 3 a side view thereof taken on the line 3—3 of Fig. 2; Fig. 4 a bottom view of the knuckle pin connection; Fig. 5 a sectional view of a modified form of connection; and Fig. 6 an edge view of the wedge pin.

Referring to the drawings, the reference numerals 1, 2 and 3 indicate the drive wheels at one side of a locomotive, each of which has the usual crank pin 4 eccentrically arranged at one side of its axis, and weight 5 at the other side of its axis to counterbalance the side rods and connecting rod which are carried by the crank pins 4.

In engine construction it is customary to connect up the crank pins 4 by means of side rods so that the wheels operate in unison, and the outer end of the connecting rod, which operates the wheels, is pivoted on the crank pin 4 of one of the intermediate wheels, said pin being extended for the purpose of affording such connection. In the present illustration, I have shown a set of three driving wheels, merely for the purpose of illustrating the application of my invention, but it is to be understood that a larger number may be employed and my invention likewise applied thereto.

When there are three drive wheels, two side rods 6 and 7 are employed, the former of which is pivoted at its rear end to the crank pin 4 of the rear wheel 1 and at its forward end to the crank pin 4 of the intermediate wheel 2, and this rod extends forwardly beyond the last mentioned crank pin and is bifurcated to afford a pair of spaced forwardly extending lugs or projections 8 and 9 between which the end of the side rod 7 is pivoted, such connection being required to permit relative raising and lowering of the wheels 2 and 3, due to irregularities of the track surface over which the wheels operate. The forward end of the side rod 7 is pivoted to the crank pin 4 of the front wheel 3.

A connecting rod 10 is pivoted in the usual manner at its forward end to the cross head 11 operating between the guides 12, and the rear end of this connecting rod is pivoted to the crank pin 4 of the wheel 2 at the outer side of the side rods 6 and 7 in the usual manner.

The structure so far described is typical of modern locomotive construction and my invention has reference to an improved pivotal connection of the side rod 7 with the side rod 6 whereby the connecting pin, which is commonly known as the knuckle pin, may be inserted from the outer side and held securely in place.

In the previous connection of the side rods such as 6 and 7 it has been customary to provide the lugs 8 and 9 with corresponding tapered openings 13 and 14 which, however, were arranged reversely to those shown in the drawings, that is, the apertured lug 9 was arranged next to the drive wheel 2 and the apertured lug 8 arranged at the outside and the tapered apertures 13 and 14 converged outwardly so as to be wedgingly engaged by tapered shoulders of the pivot pin when the latter was inserted from the inside. With my invention I am enabled to use the same connecting rods by reversing the connecting rods from one side of the engine to the other, which reversal positions the openings 13 and 14 so that a similarly formed pivot pin may be inserted from the outer side. This pivot pin 15 is tapered at the inner end as indicated at 16 so as to fit in the tapered aperture 13 of the lug 8 and is tapered at the outer end as indicated at 17 to fit in the tapered aperture 14 of the lug 9 and has an intermediate straight or cylindrical portion 18 which fits in a corresponding aperture in the rear end of the side rod 7 which is inserted between the lugs 8 and 9. The outer end of the pin 15 projects slightly beyond the outer surface of the lug 9 and is slotted diametrically, as at 19, so as to be engaged by a rib 20 on the inner face of a wedge key 21 and be held thereby from turning. This key 21 also serves to lock the pin 15 securely in place and said pin, together with the pivot lug 9, are specially constructed to afford a locking device for the pin 15 which will be contained within the limited space which is provided between the outer face of the lug 9 and the inner face of the connecting rod 10, this space in practice being about one and one-half inches.

This retaining means is also devised so that it may be readily applied to existing side rods without difficulty and to this end I provide on the outer face of the lug 9 and at the top and bottom thereof, pairs of spaced lugs 22 and 23, respectively, which are preferably electro-welded onto the outer face of the lug 9. The opposed faces of each pair of lugs are dovetailed as indicated at 24 and the wedge key 21 has correspondingly beveled edges 25 which engage the inner faces 24 of the lugs 22 and 23 and hold the wedge key in close relation to the side of the lug 9. The rear face of the key 21 is formed with the rib 20 which is tapered slightly, as shown in Fig. 6, so as to draw against the bottom of the slot or groove 19 in the outer end of the pin 15 and thereby wedge same into place in the apertures 13 and 14 of the lugs 8 and 9. For the purpose of drawing the key 21 into place a threaded extension 26 is formed on the lower end thereof and a rectangular plate 27 fitted against the under side of the lugs 23, which latter are preferably elevated a slight distance above the lower edge of the lug 9, so that the plate 27 bears edgewise against the outer face of the lug 9. This plate 27 is perforated to receive the extension 26 of the wedge key therethrough and there is a nut 28 threaded on the extension 26 against the plate 27, with lock washer 29 interposed, for drawing and locking the key in place. A lock nut 26 is threaded on the stem 26 against the nut 28 and cotter pin 29 is inserted through the threaded extension 26 immediately below the nut 36 to prevent unloosening of the nut.

From the foregoing it will be observed that I have provided means which may be readily applied to existing forms of side rods, without difficulty, to convert same for use with a knuckle pin which is inserted from the outer side, and have afforded a substantial and dependable retaining means for the knuckle pin which is readily contained within the limited space between the side rod and connecting rod of the engine.

To avoid separation or spreading of the lugs 8 and 9, I provide a cross plate 30 which extends across over the upper edges of the lugs 8 and 9 and is welded thereto so as to integrally unite said lugs. This plate may be readily employed without interfering with the assembling of the side rods 6 and 7, as it is customary to elevate the rear end of the side rod 7 up between the lugs 8 and 9. As a further precaution against separation of the lugs 8 and 9, I weld onto the lower edges of each of the lugs 8 and 9, adjacent the outer ends, the corresponding depending ears 31 which are provided with threaded apertures to receive a cross bolt or pin 32. This pin is spaced sufficiently below the rear end of the side rod 7 to permit the necessary relative pivotal movement of the rods 6 and 7, and is threaded at each end so as to have a threaded engagement with both pivot lugs 8 and 9 and thereby lock said pivot lugs in a definite spaced relation. The pin has a head 37 at the outer end for screwing same in place and may also have a lock nut 38 under the head.

In Fig. 5 I have shown a modified application of my invention, in which the means employed for holding the pin 12 from turning is the same as that at present employed, and when such holding means is employed it is not necessary to provide the pin 15 with the slot 19 at the inner end or the key 21 with the rib 20 on the inner face. Such holding means comprises a spline 39 which is inserted laterally into the outer tapered portion 17 of the pin 15 and projects slightly therefrom, so as to engage in a groove 40 in the tapered opening 14. When this holding means is provided, the rear face of the key 21 does not need to have the tapered rib 20, but the rear face of the key 21 is merely tapered so as to engage against the projecting end of the pin 15 so as to secure the latter in place. The lugs 22 and 23, the top plate, and ears 31 are preferably electro-welded onto the side rods, particularly in utilizing existing side rods, and after welding, the rods should be annealed to prevent any break.

While I have shown and described my invention in a particular form, I am aware that various changes and modifications may be made without departing from the principles of my invention, the scope of which is to be determined by the appended claims.

I claim as my invention:

1. In a locomotive, the combination of a plurality of side drive wheels each of which has an outwardly extending crank pin, side rods connecting the crank pins so that the drive wheels operate in unison, and means for pivotally connecting together the adjoining ends of the side rods comprising a pin inserted from the outer side through the adjoining ends of the rods and having retaining means at the outer end for locking the pin in the inserted position.

2. The combination with the side drive wheels of a locomotive and connecting rod for operating same, of a pair of side rods connecting the drive wheels so as to cause same to operate in unison, said side rods being provided with a pivotal connection interposed between the connecting rod and one of the drive wheels for pivotally connecting adjacent ends of the side rods to one another, said connection comprising a pin inserted through overlapping portions of the side rods from the outer side thereof, and means on the outer face of one of the side rods for forcing and holding the pin in the inserted position.

3. In a locomotive having a plurality of drive wheels at one side thereof, the combination of a connecting rod pivoted eccentrically to one of the drive wheels for rotating the latter, side rods connecting the drive wheels so as to cause the latter to operate in unison, said side rods having the adjacent ends thereof connected together between the connecting rod and its drive wheel, said connection comprising a pivot pin adapted to be inserted from the outer side of the side rods through overlapping portions of the latter and having shoulders for limiting the insertion thereof, and a clamping member adapted to be secured against the outer end of the pivot pin for forcing and holding the latter in the inserted position.

4. In a locomotive having a plurality of drive wheels at one side thereof, the combination of a connecting rod eccentrically pivoted to one of the drive wheels, a plurality of side rods connecting the drive wheels so as to cause the latter to operate in unison, and means pivotally connecting the adjoining ends of the side rods between the connecting rod and its drive wheel, said means comprising a pair of spaced lugs at the end of one of the side rods embracing the end of the other side rod, inwardly converging tapered apertures in the lugs in alinement with an aperture in the end of the side rod embraced by the lugs, a pivot pin inserted through said apertures and having tapered portions wedgingly engaging said tapered apertures of the lugs, and a key on the outer face of the outer lug wedgingly engaging the outer end of the pivot pin so as to clamp the tapered portions of the pin in the tapered apertures of the lugs and adapted to hold the pivot pin against turning movement in the apertures of the lugs.

5. The combination with a plurality of drive wheels at one side of a locomotive, of a connecting rod eccentrically pivoted to one of the drive wheels, a plurality of connecting rods pivoted to the drive wheels so as to cause the latter to operate in unison, a pivot pin inserted from the outer side of the side rods through apertures in the overlapped adjoining ends of the latter for affording pivotal connection therebetween, undercut spaced lugs on the outer face of one of the connecting rods, and a key having beveled edges engaging the undercut lugs and provided with a wedge surface engaging against the outer extremity of the pivot pin for clamping the latter in the inserted position.

6. The combination with a plurality of side drive wheels of a locomotive, of a plurality of side rods connecting said wheels so as to cause the latter to operate in unison, means for connecting the adjoining ends of the side rods together, comprising a pair of spaced lugs on one of the side rods embracing the end of the other side rod, a pivot pin inserted from the outer side of the side rods through the said end of the lugs and having corresponding tapered portions wedgingly engaging the latter, means on the outer face of the outer lug for locking the pin in the inserted position, and means for connecting the lugs together to prevent spreading or separation thereof.

7. The combination with a plurality of side drive wheels of a locomotive, of a plurality of side rods connecting said wheels so as to cause the latter to operate in unison, means for connecting the adjoining ends of the side rods together, comprising a pair of spaced lugs on one of the side rods embracing the end of the other side rod, a pivot pin inserted from the outer side of the side rods through the said end and the lugs and having corresponding tapered portions wedgingly engaging the latter, means on the outer face of the outer lug for locking the pin in the inserted position, and a plate connecting the lugs and secured to the edges thereof to prevent spreading or separation thereof.

8. The combination with a plurality of side drive wheels of a locomotive, of a plurality of side rods connecting said wheels so as to cause the latter to operate in unison, means for connecting the adjoining ends of the side rods together, comprising a pair of spaced lugs on one of the side rods embracing the end of the other side rod, a pivot pin inserted from the outer side of the side rods through the said end of the lugs and having corresponding tapered portions wedgingly engaging the latter, means on the outer face of the outer lug for locking the pin in the inserted position, and means extending between and having a threaded engagement with the lugs for holding the latter against separation.

9. The method of adapting side rods of a locomotive having a pivot pin inserted from the inner side thereof through adjoining end portions of the side rods so as to employ a pivot pin inserted from the outer side thereof, which comprises transposing the connecting rods from one side to the other side of the locomotive, electro-welding retaining means on the outer side of the transposed side rod adjacent the position of the pivot pin, and mounting a key in the retaining means so as to engage against the outer end of the pivot pin and clamp the latter in the inserted position.

JOHN W. BUCHANAN.